US008236444B2

(12) United States Patent
Cui et al.

(10) Patent No.: US 8,236,444 B2
(45) Date of Patent: Aug. 7, 2012

(54) ELECTROCHEMICAL CELL HAVING LOW VOLUME COLLECTOR ASSEMBLY

(75) Inventors: Ning Cui, Lyndhurst, OH (US); Urs Krebs, Westlake, OH (US); Peter R. Tsai, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1182 days.

(21) Appl. No.: 11/691,801

(22) Filed: Mar. 27, 2007

(65) Prior Publication Data

US 2008/0241678 A1 Oct. 2, 2008

(51) Int. Cl.
*H01M 2/08* (2006.01)

(52) U.S. Cl. ........ 429/185; 429/134; 429/163; 429/165; 429/166; 429/168; 429/170; 429/178; 429/181

(58) Field of Classification Search .......... 429/128, 429/133, 134, 161, 164–169, 170–174, 178–181
See application file for complete search history.

(56) References Cited

U.S. PATENT DOCUMENTS

| | | | |
|---|---|---|---|
| 3,042,734 A | | 7/1962 | Carmichael et al. |
| 3,069,485 A | | 12/1962 | Winger et al. |
| 3,442,716 A | | 5/1969 | Muraki et al. |
| 4,060,671 A | | 11/1977 | Vandervelden |
| 4,144,382 A | | 3/1979 | Takeda et al. |
| 4,740,435 A | * | 4/1988 | Markin et al. ............... 429/174 |
| 4,939,048 A | | 7/1990 | Vignaud |
| 5,150,602 A | * | 9/1992 | Payne et al. ............... 29/623.2 |
| 5,397,658 A | | 3/1995 | Dunham |
| 5,688,294 A | * | 11/1997 | Mizuno et al. ............... 29/623.2 |
| 5,849,431 A | * | 12/1998 | Kita et al. ............... 429/164 |
| 5,856,040 A | | 1/1999 | Newman et al. |
| 5,895,734 A | | 4/1999 | Nardi et al. |
| 5,962,163 A | | 10/1999 | Urry |
| 6,143,439 A | * | 11/2000 | Yoppolo et al. ............... 429/91 |
| 6,296,970 B1 | * | 10/2001 | Killebrew et al. ............ 429/158 |
| 6,399,243 B1 | * | 6/2002 | Kaplan et al. ............... 429/176 |
| 6,410,186 B1 | | 6/2002 | Tucholski et al. |
| 6,605,383 B1 | | 8/2003 | Wu |
| 6,627,349 B2 | | 9/2003 | Urry et al. |

(Continued)

FOREIGN PATENT DOCUMENTS

JP 4167358 6/1992

(Continued)

OTHER PUBLICATIONS

"integral" definition by the Online Merriam-Webster Dictionary. Accessed May 10, 2011.*
Patent Cooperation Treaty (PCT), International Search Report and Written Opinion for Application No. PCT/US2008/001957, filed Feb. 14, 2008, mailed May 5, 2008, European Patent Office, Netherlands.

*Primary Examiner* — Ula C Ruddock
*Assistant Examiner* — Amanda Barrow
(74) *Attorney, Agent, or Firm* — Michael C. Pophal (57) ABSTRACT

A low volume collector assembly and an electrochemical cell employing a collector assembly are provided. The electrochemical cell includes an electrically conductive can having inner and outer electrodes disposed therein. The cell also includes a collector assembly assembled to an open end of the can to provide closure to the open end of the can. The collector assembly includes a seal and a cover assembled to the seal to provide a sealed closure to the open end of the can. The cover includes an integrally formed current collector portion that contacts one end of the inner electrode. The cover serves as a current collector and also serves as a contact terminal of the cell.

19 Claims, 4 Drawing Sheets

U.S. PATENT DOCUMENTS

| | | |
|---|---|---|
| 6,986,969 B2 | 1/2006 | Anglin et al. |
| 2002/0106560 A1* | 8/2002 | Kolb et al. .................... 429/212 |
| 2003/0152831 A1* | 8/2003 | Davidson et al. ............. 429/174 |
| 2004/0115531 A1* | 6/2004 | Ueki et al. .................... 429/223 |
| 2005/0153194 A1 | 7/2005 | Kimura et al. |
| 2005/0214648 A1 | 9/2005 | Boulton et al. |

FOREIGN PATENT DOCUMENTS

| | | |
|---|---|---|
| JP | 2000 100445 | 4/2000 |
| JP | 2000 285901 | 10/2000 |
| JP | 2002 175815 | 6/2002 |
| JP | 2006066087 A | 3/2006 |

* cited by examiner

ELECTROCHEMICAL CELL HAVING LOW VOLUME COLLECTOR ASSEMBLY

BACKGROUND OF THE INVENTION

The present invention generally relates to electrochemical cells (i.e., batteries) and, more particularly, relates to a low volume collector assembly for collecting electrical current and sealing closed the open end of an electrochemical cell container.

Conventional alkaline electrochemical cells generally include a cell container in the form of a cylindrical steel can having a closed bottom end, a cylindrical side wall and an open top end. Disposed within the steel can is a positive electrode, also referred to as the cathode, and a negative electrode, also referred to as the anode. The cathode typically employs manganese dioxide as the active material, while the negative electrode typically employs zinc powder as the active material. In bobbin-type cells, the cathode is typically formed in a tubular shape with the outer surface engaging the interior surface of the steel can, and the anode is generally formed in the shape of a cylinder centrally disposed in the can. A separator is located between the anode and the cathode, and an alkaline electrolyte solution simultaneous contacts the anode, the cathode and the separator.

The steel can is typically in electrical contact with a positive contact terminal at the closed end and the outer surface of the cathode, and thus serves as the cathode current collector. An anode current collector is typically inserted into the anode to provide an electrical path for current to pass to a negative outer terminal provided at the open end of the can. The anode current collector is typically assembled as a component of a collector assembly that provides closure to the open end of the steel can to seal the active electrochemical materials in a sealed volume of the can. The collector assembly typically employs an annular polymeric (e.g., nylon) seal, the negative outer terminal, and the current collector, and may further include an inner neutral cover that radially supports the seal. In some cells the collector assembly further includes a Belleville washer and spur.

Conventional cylindrical alkaline cells are typically sealed closed by placing the collector assembly in the open end of the steel can and crimping the open end of the can inwardly and over the outer periphery of the collector assembly to compress the seal. The conventional electrochemical cell employs an electrically conductive current collector, typically in the shape of an elongated brass nail, inserted into the anode active material. The current collector nail generally extends through a central opening provided in the hub of the seal and provides an electrical connection between the anode and the outer conductive cover which serves as the battery cell negative terminal. The elongated brass nail generally extends into the anode by a considerable length (e.g., 80%) and has a sufficiently large diameter such that the nail consumes considerable volume within the can. The current collector is typically welded or otherwise press fit to the negative terminal to maintain suitable electrical contact therebetween.

The conventional collector assembly typically made up of the brass nail, annular nylon seal, outer negative cover and an inner neutral cover requires many components. The components making up the collector assembly add to the overall component cost, and require costly equipment to manufacture and assemble. Additionally, the conventional elongated current collector nail and other components of the collector assembly typically consume a substantial useable volume within the cell, which limits the amount of volume available for electrochemically active materials. Further, the conventional elongated nail collector design usually requires a welding or press fit connection between the outer terminal which involves additional equipment costs and process steps and, with the press fit assembly, may result in electrical contact problems and reduced reliability.

Accordingly, there exists a need for a cost affordable and improved current collector assembly that may be easily assembled into an electrochemical cell. There further exists a need for an electrochemical cell that employs a current collector assembly that consumes less volume within the can, thereby leaving more useable volume for electrochemically active materials.

SUMMARY OF THE INVENTION

The present invention provides enhanced reliability and process assembly of a collector assembly that is cost-effective, easy to assembly, and offers low volume consumption. To achieve these and other advantages, and in accordance with the purpose of the invention as embodied and described herein, an electrochemical cell and a collector assembly therefore are provided according to the present invention. According to one aspect of the present invention, the electrochemical cell includes a container having an open end, a first electrode disposed in the container and a second electrode disposed in the container. The electrochemical cell further has a seal disposed in the open end of the container and an electrically conductive cover engaged to the seal in the open end of the container such that the seal and cover close the open end of the container. The cover includes an integrally formed current collector portion in contact with one end of the first electrode.

According to another aspect of the present invention, the electrochemical cell includes a container having an open end, an inner electrode disposed in the container and an outer electrode disposed in the container. The assembly also includes a collector assembly disposed in the open end of the container. The collector assembly includes a cover engaged to a seal such that the collector assembly closes the open end of the container. The cover includes a current collector portion in contact with only one end of the inner electrode.

According to a further embodiment of the present invention, a collector assembly is provided for closing an open end of a container of an electrochemical cell. The collector assembly includes a seal generally configured to receive a cover and fit within an open end of a cell container. The collector assembly also includes an electronically conductive cover assembled to the seal such that the cover and seal are adapted to provide a sealed closure to the open end of the cell container. The cover includes an integrally formed current collector portion adapted to be in contact with one end of an electrode disposed within a cell container.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
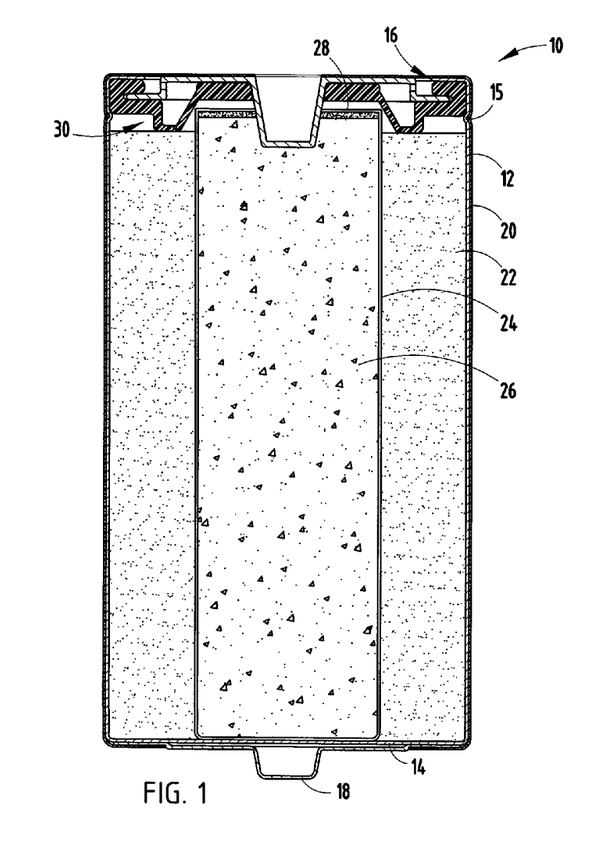
FIG. 1 is a longitudinal cross-sectional view of an electrochemical cell having a collector assembly, according to one embodiment of the present invention.
Figure 2:
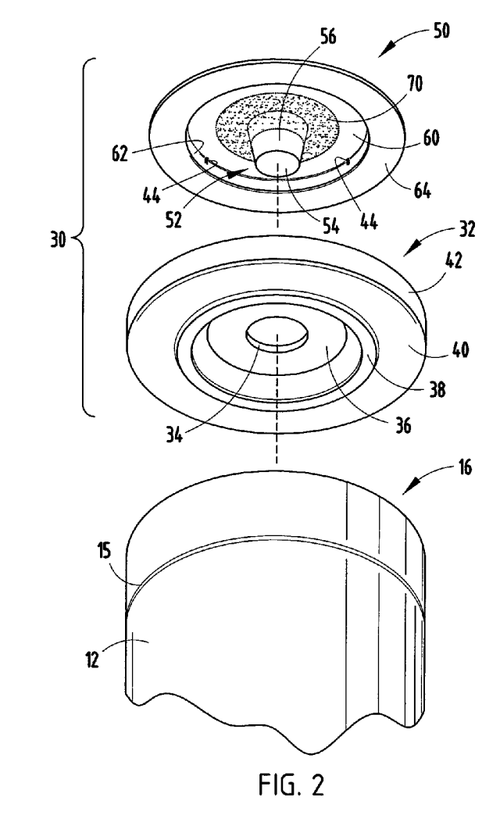
FIG. 2 is an exploded view of the collector assembly prior to assembly in the cell can.
Figure 3:
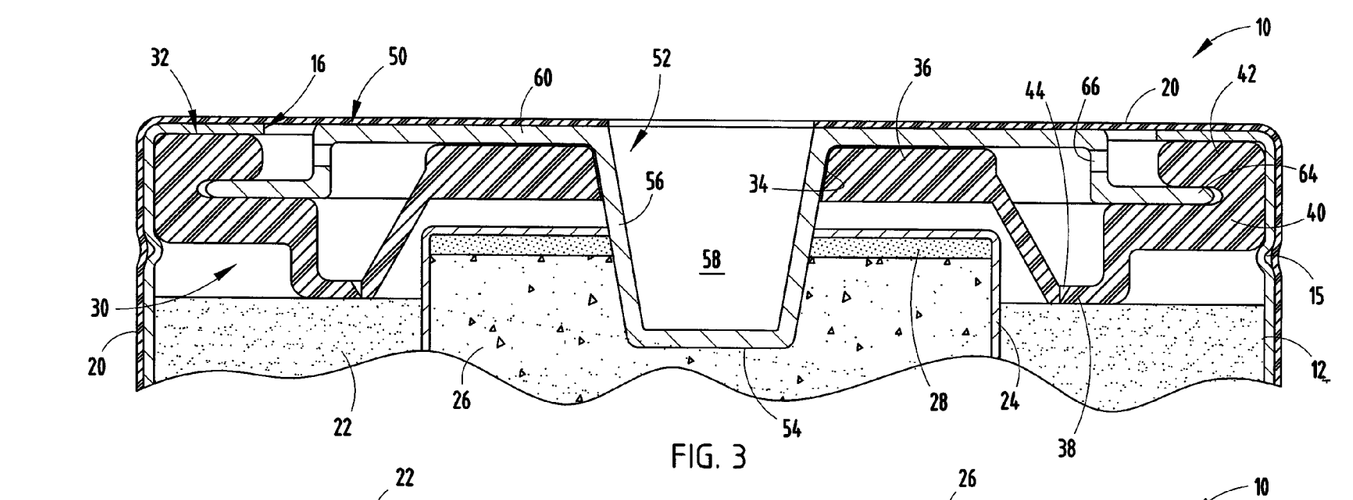
FIG. 3 is an enlarged cross-sectional view of the top portion of the cell shown in FIG. 1 further illustrating the collector assembly.

Referring to FIGS. 1-3, a cylindrical alkaline electrochemical cell 10 is illustrated having a collector and seal assembly 30, according to a first embodiment of the present invention. The electrochemical cell 10 includes a cylindrical steel can 12, also generally referred to as a container, having a closed bottom end 14, an open top end 16, and a cylindrical side wall extending between the bottom and top ends. The closed bottom end 14 of can 12 has a positive cover or terminal 18 welded or otherwise attached thereto and formed of plated steel, with an outward protruding nubbin provided at a center region, which forms the positive contact terminal of cell 10. Assembled to the open top end 16 of steel can 12 is the collector and seal assembly 30 which serves to seal closed the open end 14 of can 12 and is integrally formed to have a combined current collector and negative contact terminal of cell 10.

The electrochemical cell 10 includes a positive electrode 22, also referred to as the cathode, and a negative electrode 26, also referred to as the anode, both disposed within a sealed volume of the steel can 12. The cathode 22 is formed as an outer electrode disposed in the container about the interior surface of steel can 12, and is generally tubular shaped. The outer electrode is in the shape of a hollow tube, the cross-section of the tube being in the shape of a ring. The outer electrode surrounds the inner gel electrode and is entirely between the inner gel electrode and the container. According to one example, the cathode 22 may be formed of a mixture of manganese dioxide, graphite, potassium hydroxide (KOH) solution and additives. The cathode 22 results in an outer electrode that is in electrical contact with the interior surface of the steel can 12, such that the steel can 12 serves as the cathode current collector. The cathode 22 may be formed using ring molding or impact molding cathode formation and assembly techniques.

A separator 24 is disposed about the interior surface of cathode 22 and may be cup-shaped with a closed bottom, according to an exemplary embodiment. The separator 24 may be formed of a non-woven fabric that prevents migration of solid particles between the anode 26 and cathode 22, as should be evident to those skilled in the art.

The anode 26 is disposed centrally within steel can 12 inside of separator 24 to form an inner electrode. The anode 26 may be a gel type anode and consumes a generally cylindrical shape. The inner gel electrode is in the shape of a cylinder entirely disposed within the container. The anode 26 may be disposed with an electrolyte which may include an alkaline electrolyte containing potassium hydroxide (KOH). According to one example, the anode 26 may be formed of zinc powder, a gelling agent and additives. Also disposed in the can 12 on top of the anode 26 is a gelled KOH reservoir plug 28 which may serve as an electrolyte reservoir. In this embodiment, the upper end of separator 24 is shown folded radially inward over anode 26 and on top of reservoir plug 28.

Accordingly, the cathode 22 is configured as an outer electrode that serves as a cell's positive electrode, and the anode 26 is configured as an inner electrode that serves as a cell's negative electrode. In the example disclosed, the manganese dioxide and zinc employed in the cathode 22 and anode 26, respectively, are electrochemically active materials. It should be appreciated that other electrochemically active materials and additives may be employed in the electrochemical cell 10 employing the collector and seal assembly 30, according to the present invention.

The collector and seal assembly 30, also referred to herein as the collector assembly, is generally shown in FIGS. 1-3 made of two assembled components, including an annular seal 32 and an electrically conductive cover 50. Additionally, a sealant 70 may be disposed between seal 32 and cover 50 to prevent leakage therebetween. The cover 50 serves as a can closure component and also serves as the negative contact terminal and the anode current collector. The cover 50 matingly engages seal 32 to form the collector assembly 30 which is inserted as an assembled unit into the open end 16 of steel can 12. Steel can 12 is shown having an inward bead 15 formed a short distance from the open end 16 of can 12 to provide an interior surface against which the collector assembly 30 may rest on top of within can 12. Alternately, a flared can opening may be employed. The open end 16 of steel can 12 is crimped inward and over the outer peripheral portion of the collector assembly 30 to compress the seal 32 and form a sealed closure of the steel can 12.

The seal 32 is electrically insulative (dielectric) and may be made of a synthetic thermoplastic resin, such as nylon or other known suitable seal material. Seal 32 includes a central opening 34 having a shape and size adapted to receive a cup-shaped portion 52 of cover 50 that serves as the current collector portion in electrical contact with anode 26. In the disclosed embodiment, seal 32 has a circular opening 34. Seal 32 has a generally flat portion 36 extending between the opening 34 and a downward angled ridge 38. The ridge 38 of seal 32 has a reduced thickness vent 44 formed therein. The reduced thickness vent 44 is intended to rupture upon experiencing a sufficient pressure differential. Extending outward from ridge 38 is another generally flat portion 40 which leads to an upstanding wall 42 at the periphery of the seal 32. The upstanding wall 42 is adapted to be folded inward and compressed during the can closure crimping process.

The electrically conductive cover 50 is integrally formed with the generally cup or cap-shaped inward protruding nubbin 52 in the central region that serves as the anode current collector. The cup-shaped nubbin 52 is integrated in the cover 50 and is of a shape and size that is adapted to be disposed in direct contact with one end of the anode 26. The cup-shaped nubbin 52 forming the anode current collector is formed as an integral portion of the cover 50. According to one embodiment, the cover 50 may be made from a copper alloy, such as brass or bronze, with tin or indium plating/burnishing. According to another embodiment, the cover 50 may be made of a polymeric material having an electrically conductive coating on both sides. The cup-shaped nubbin 52 is shown formed inward at the central portion of cover 50 in a generally frustoconical shape having an angled side wall 56 and a flat bottom end wall 54. The cup-shaped nubbin 52 is shaped and sized to be received within like-size central opening 34 in seal 32. Cover 50 includes a flat portion 60 extending radially outward from the cup-shaped nubbin 52 that leads to a downward extending wall 62. Extending from the bottom of wall 62 is a flat ring shaped portion 64 that extends to the outer periphery and forms a flange.

The collector assembly 30 may be preassembled by inserting the cover 50 into engagement with seal 32 within the upstanding wall 42 of seal 32 as seen in FIG. 2. In doing so, the cup-shaped nubbin 52 extends through opening 34 of seal 32. It should be appreciated that sealant 70 may be disposed between seal 32 and cover 50, particularly between wall 56 and flat portion 70 of cover 50 and corresponding surfaces of opening 34 and flat portion 36 of seal 32, so as to prevent leakage therebetween. The preassembled collector assembly 30 is then inserted as a unit into the open end 16 of steel can 12 such that the assembly rests on top of bead 15. The upper end of steel can 12 is then crimped radially inward over the top peripheral portion of collector assembly 30 so as to form a sealed closure to can 12.

The outer periphery of the flange 64 of cover 50 is adapted to fit within the upstanding walls 42 of seal 32 such that wall 42 of seal 32 is bent radially inward during the can closure crimping process such that portions 40 and 42 of seal 32 are compressed on opposites of flange 64 to form the sealed closure. The cover 50 provides radial support for the can closure, also provides a cover 50 and further serves as a negative contact terminal on the outside surface. The cup-shaped nubbin 52 of cover 50 protrudes inward within the sealed volume of can 12 in direct electrical contact with the top end only of anode 26. Thus, the cover 50 also serves as the anode current collector to collect electrical current from within anode 26 and make the collected current available at the negative contact terminal.

According to an exemplary embodiment, the cup-shaped protruding nubbin 52 of cover 50 extends inward by a sufficient height such that the bottom flat wall portion 54 extends into direct contact with one end of anode 26. It should be appreciated that the current collector portion 52, particularly the bottom flat wall portion 54 of the cover 50, is in electrical contact with the anode 26 to collect electrical current. The cover 50 is integrally formed with the cup-shaped nubbin 52 such that it extends into contact with one end of the anode 26. It should also be appreciated that the current collector portion 52 of cover 50 may extend into the anode 26 by a distance up to 20% of the longitudinal length of anode 26, so as to insure electrical contact with the anode 26 and still be considered at the end of the anode 26. According to one embodiment, the flat bottom surface 54 of cover 50 has a surface area of at least 25% of the cross-sectional area at the top end of the anode 26.

Formed within the seal 32 is the vent mechanism 44, which is intended to rupture at a predetermined pressure. In the embodiment shown, the vent mechanism 44 includes a reduced thickness portion of seal 32 shown formed in the downward extending ridge 38 of seal 32. Upon reaching a predetermined pressure differential, the reduced thickness vent 44 is intended to rupture to release high pressure gases from within steel can 12. The release of high pressure gases exhausted through ruptured vent 44 may be passed to the outside environment through one or more openings 66 provided in the cover 50.

The electrochemical cell 10 further includes a plastic film label 20 formed about the exterior surface of the steel can 12. The film label 20 may be formed over the peripheral edge of the positive cover 18 at the closed end 14 and is further shown extending over a substantial portion of the cover 50 at the opposite end 16. In the embodiment shown, the label 20 extends over the peripheral edge of the can crimp and further extends over substantially the entire flat portion 60 of the cover 50. The label 20 is electrically insulative (i.e., dielectric) such that electrical current is prohibited from passing through label 20. In the exemplary embodiments shown, the exterior surface of the cup-shaped nubbin 52 is not covered by label 20, such that electrical contact can be made with the cover 50 on the exterior surface of the nubbin 52 within the recessed volume 58.

Accordingly, the collector assembly 30 of the present invention advantageously provides for a simplified, cost affordable and low volume assembly made up of essentially two components, namely, the seal 32 and the cover 50. The collector assembly 30 seals closed the open end 16 of steel can 12, collects electrical current from within the inner electrode (anode) 26, and serves as the negative contact terminal of cell 10. The reduced component collector assembly 30 results in an easy to manufacture and assemble collector assembly 30 and electrochemical cell 10 that realizes lower cost. Additionally, the cover 50 of collector assembly 30 provides an integral current collector portion that consumes a small volume of the cell 10, such that more volume is made available to electrochemically active materials.

Figure 4:
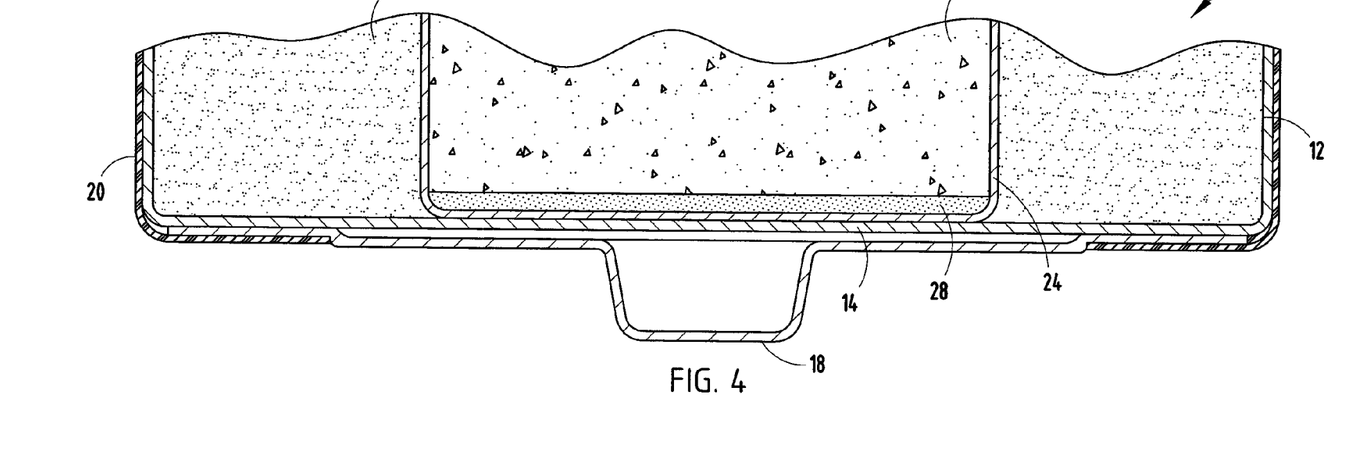
FIG. 4 is an enlarged cross-sectional view of a bottom portion of an electrochemical cell employing a KOH reservoir pad, according to another embodiment.

Referring to FIG. 4, the electrochemical cell 10 is shown in an alternative embodiment employing the gelled KOH reservoir plug 28 provided inside the opposite closed end 14 of the steel can 12. The KOH reservoir plug 28 may include a gelled electrolyte. During cell discharging, the anode generally expands such that it will compress the reservoir plug to release additional KOH for cell discharging, a chemical reaction, thus further improving the cell performance. It should be appreciated that cell 10 may be configured with or without the gelled KOH reservoir plug 28, or may employ a reservoir plug 28 of various sizes and shapes at either or both ends of the can 12 or at various other locations within the cell 10 to provide a reservoir for the electrolyte.

Figures 5, 6:
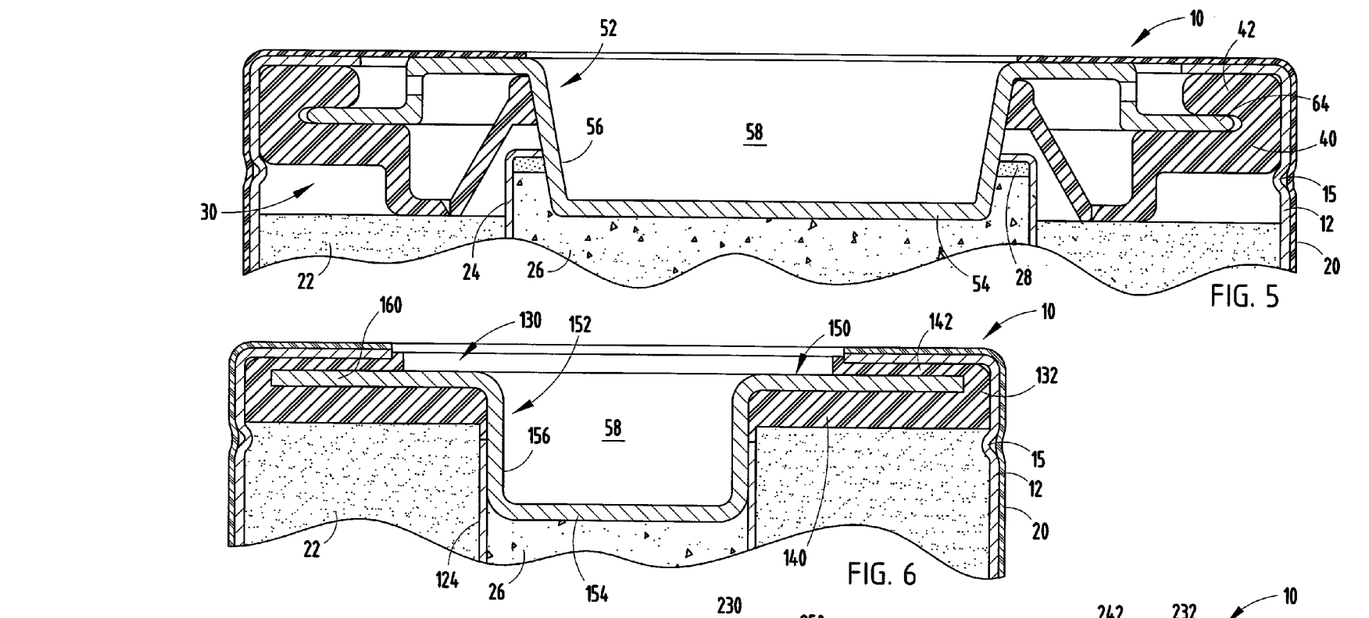
FIG. 5 is a longitudinal cross-sectional view of the top portion of an electrochemical cell having a collector assembly with an enlarged cup-shape current collector portion, according to a second embodiment of the present invention.
FIG. 6 is a longitudinal cross-sectional view of the top portion of an electrochemical cell having a collector assembly, according to a third embodiment of the present invention.

Referring to FIG. 5, an electrochemical cell 10 is shown employing a collector and seal assembly 30, according to a second embodiment. In this embodiment, the cup-shaped nubbin 52 of metal cover 50 has an enlarged diameter nubbin 52 such that flat bottom wall portion 54 has a larger surface area in contact with top end of anode 26. By employing an enlarged diameter inward protruding nubbin 52 integrated in cover 50, the electrochemical cell 10 achieves enhanced surface area electrical contact between the current collector portion 52 of the cover 50 and the anode 26. The enlarged surface area of the current collector portion 52 may enhance electrical current collection and current transport from anode 26 to the outer surface or contact terminal of cover 50.

Referring to FIG. 6, an electrochemical cell 10 is shown employing a collector and seal assembly 130 configured according to a third embodiment. In this embodiment, the assembly 130 has an electrically conductive metal cover 150, which includes flat peripheral ring or flange portion 160 and a cup-shaped portion 152, which has substantially vertical side walls 156 that transition perpendicular to provide the bottom flat wall portion 160. The cup-shaped nubbin 152 includes a substantially flat bottom portion 154, which is in direct contact with one end of anode 26. In this embodiment, the cup-shaped portion 152 of cover 150 essentially provides a further enlarged flat bottom surface 154 which generally extends substantially the entire cross-sectional area of the top end of the anode 26. Cover 150 is disposed so that the flat portions forming the peripheral flange 160 engage a seal 132 between compressed portions 140 and 142 of seal 132 when the can 12 is crimped closed. Additionally, the separator 124 is shown terminating near the upper end of the cathode 22, however, it should be appreciated that separator 124 may be folded outward over a portion of the cathode 22. Accordingly, the collector assembly 130 in this embodiment provides a further enhanced surface area electrical contact between the current collector portion 152 of cover 150 and anode 26.

Figure 7:
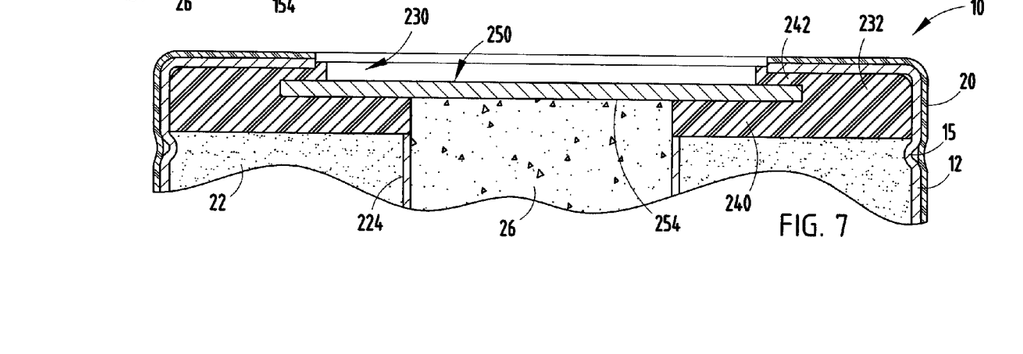
FIG. 7 is a longitudinal cross-sectional view of the top portion of an electrochemical cell having a collector assembly, according to a fourth embodiment of the present invention.

Referring to FIG. 7, an electrochemical cell 10 is illustrated employing a collector and seal assembly 230 in which a cover 250 is substantially planar, according to a fourth embodiment. In this embodiment, the cover 250 is generally recessed within a seal 232 such that the periphery of cover 250 is sealingly engaged between compressed seal portions 240 and 242 of seal 232 once the can is crimped closed. The cover 250 provides a substantially linear surface in direct contact with the top end of the anode 26. This results in the electrically conductive cover 250 serving as an anode current collector that does not extend into the anode 26, and thus the cover 250 contacts the entire top end of anode 26 and consumes less volume within the cell can 12.

Figure 8:
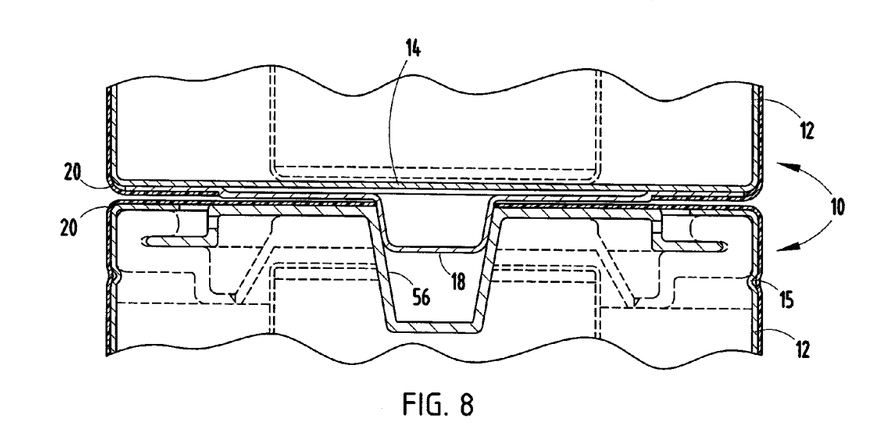
FIG. 8 illustrates opposite polarity ends of two electrochemical cells connected in series.
Figure 9:
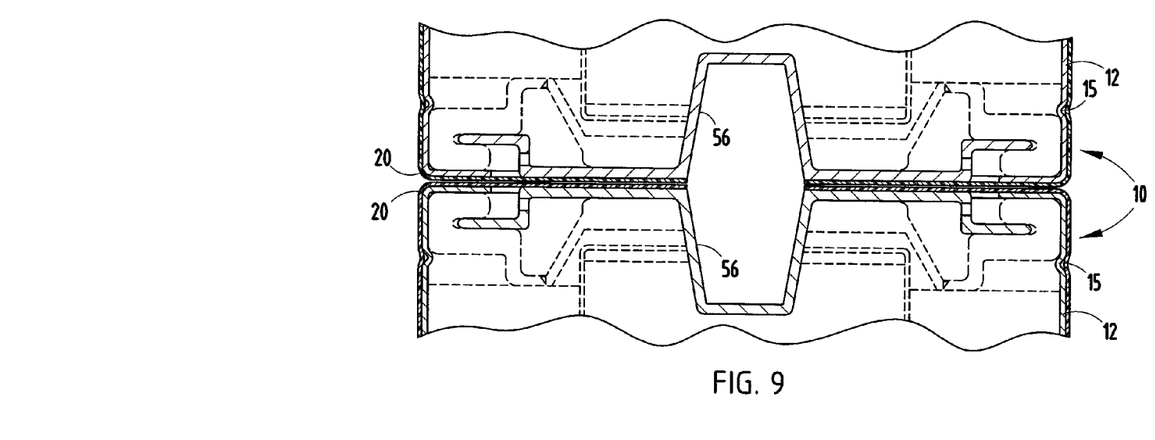
FIG. 9 illustrates the same polarity ends of two electrochemical cells improperly reverse oriented.

Referring to FIGS. 8 and 9, examples of two electrochemical cells 10 are partially shown arranged with the cells 10 oriented in series contact in FIG. 8, and with a reverse discharge orientation shown in FIG. 9. In FIG. 8, first and second electrochemical cells 10 are illustrated with the positive contact terminal of one cell in contact with the negative contact terminal of the other cell. According to one embodiment of the present invention, the positive contact terminal of one cell contacts the negative contact terminal of the other cell when connected in series. However, when the two cells 10 are improperly arranged in a reverse discharge orientation as shown in FIG. 9, the dielectric label 20 prevents electrical contact between the two cells 10. This is because the label 20 extends over the cover 50 with the exception of the recessed volume 58 outside of the inward protruding nubbin 52. Accordingly, the electrochemical cell 10 advantageously prevents cell charging of misinstalled battery cells.

Accordingly, the electrochemical cell 10 employing the collector and seal assembly 30 of the present invention advantageously provides for a reduced component, low cost and easy to assemble and manufacture assembly 30. The cell 10 utilizes a collector assembly 30 that minimizes consumption of volume within the steel can 12, therefore resulting in more volume available for electrochemically active materials. The assembly 30 results in reduced raw material cost, less component and manufacturing cost, less assembly cost, less manufacturing equipment and labor, and reduces chances of experiencing defective parts.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An alkaline electrochemical cell comprising:
    a container having an open end;
    an inner gel electrode disposed in said container;
    an outer electrode disposed in said container, wherein the inner gel electrode is in the shape of a cylinder entirely disposed within the container, and the outer electrode is in the shape of a hollow tube, the cross-section of said tube being in the shape of a ring, and wherein the outer electrode surrounds the inner gel electrode and is entirely between the inner gel electrode and the container;
    a seal disposed in the open end of the container; and
    an electrically conductive cover engaged to the seal in the open end of the container such that the seal and cover close the open end of the container, wherein the cover comprises an integrally formed current collector portion of the cover and the current collector portion is in direct physical contact with one end of the inner gel electrode, and wherein the current collector portion extends into the inner gel electrode by a distance up to 20% of the longitudinal length of the inner gel electrode and a bottom surface of the current collector portion extends across at least 25% of a cross-sectional area of the inner gel electrode.

2. The electrochemical cell as defined in claim 1, wherein the current collector portion of the cover comprises a cup-shape portion extending into the container from the open end so that the cup-shape portion contacts the one end of the inner gel electrode.

3. The electrochemical cell as defined in claim 2, wherein the cup-shape portion of the cover comprises a substantially flat portion in contact with the one end of the inner gel electrode.

4. The electrochemical cell as defined in claim 2, wherein the seal comprises an opening and the cup-shape portion of the cover extends through the opening.

5. The electrochemical cell as defined in claim 4 further comprising a sealant disposed between the cover and the seal.

6. The electrochemical cell as defined in claim 2, wherein the cup-shape portion has a frusticonical shape.

7. The electrochemical cell as defined in claim 1, wherein the open end of the container is crimped inward over a peripheral portion of the seal and cover to compress the seal.

8. The electrochemical cell as defined in claim 1, wherein the inner gel electrode comprises an anode and the outer electrode comprises a cathode.

9. The electrochemical cell as defined in claim 8, wherein the container is electrically conductive and the cathode is in electrical contact with the container.

10. The electrochemical cell as defined in claim 1, wherein the cover and seal are assembled together into the open end of the container as an assembled unit.

11. The electrochemical cell as defined in claim 1, wherein the cell further comprises an electrolyte.

12. The electrochemical cell as defined in claim 1 further comprising a label provided on the outside surface of the container, wherein the label extends onto the cover to prevent reverse cell discharge.

13. The electrochemical cell as defined in claim 1, wherein the container comprises a cylindrical can.

14. The electrochemical cell as defined in claim 1, wherein the current collector portion of the cover is in contact with only one end of the inner gel electrode.

15. The electrochemical cell as defined in claim 1, wherein the current collector portion has a flat portion at the bottom surface in contact with the one end of the inner gel electrode.

16. The electrochemical cell as defined in claim 15, wherein the flat portion extends across at least 25% of a cross-sectional area at a top end of the inner gel electrode.

17. The electrochemical cell as defined in claim 1, wherein the outer electrode comprises a cathode comprising manganese dioxide and the inner gel electrode comprises an anode comprising zinc.

18. An alkaline electrochemical cell comprising:

a container having an open end;

an inner gel electrode disposed in said container;

an outer electrode disposed in said container, wherein the inner gel electrode is in the shape of a cylinder entirely disposed within the container, and the outer electrode is in the shape of a hollow tube, the cross-section of said tube being in the shape of a ring, and wherein the outer electrode surrounds the inner gel electrode and is entirely between the inner gel electrode and the container;

a seal disposed in the open end of the container; and an electrically conductive cover engaged to the seal in the open end of the container such that the seal and cover close the open end of the container, wherein the cover comprises an integrally formed current collector portion comprising a cup-shaped portion extending into the container from the open end so that the cup-shaped portion is in direct physical contact with one end of the inner gel electrode, wherein the cup-shaped portion extends into the inner gel electrode by a distance up to 20% of the longitudinal length of the inner gel electrode and a bottom surface of the cup-shaped portion extends across at least 25% of a cross-sectional area of the inner gel electrode.

19. The electrochemical cell as defined in claim 18, wherein the outer electrode comprises a cathode comprising manganese dioxide and the inner gel electrode comprises an anode comprising zinc.

* * * * *